US012731570B2

(12) United States Patent
Kojourimanesh et al.

(10) Patent No.: US 12,731,570 B2
(45) Date of Patent: Sep. 8, 2026

(54) ANECHOIC TERMINATION FOR ACOUSTIC PLANE WAVE SUPPRESSION

(71) Applicant: TECHNISCHE UNIVERSITEIT EINDHOVEN, Eindhoven (NL)

(72) Inventors: Mohammad Kojourimanesh, Eindhoven (NL); Viktor Kornilov, Eindhoven (NL); Ines Lopez Arteaga, Eindhoven (NL); Philip De Goey, Eindhoven (NL)

(73) Assignee: TECHNISCHE UNIVERSITEIT EINDHOVEN, Eindhoven (NL)

( * ) Notice: Subject to any disclaimer, the term of this patent is extended or adjusted under 35 U.S.C. 154(b) by 295 days.

(21) Appl. No.: 18/551,825

(22) PCT Filed: Mar. 23, 2022

(86) PCT No.: PCT/NL2022/050159

§ 371 (c)(1),
(2) Date: Sep. 21, 2023

(87) PCT Pub. No.: WO2022/203508

PCT Pub. Date: Sep. 29, 2022

(65) Prior Publication Data

US 2024/0161722 A1 May 16, 2024

(30) Foreign Application Priority Data

Mar. 23, 2021 (NL) .................................... 2027816
Mar. 25, 2021 (NL) .................................... 2027840

(51) Int. Cl.
*G10K 11/168* (2006.01)

(52) U.S. Cl.
CPC ................................ *G10K 11/168* (2013.01)

(58) Field of Classification Search
CPC ... G10K 11/168; F16L 55/02709; F24F 13/24
See application file for complete search history.

(56) References Cited

U.S. PATENT DOCUMENTS 1,914,072 A * 6/1933 Boylston ........... F16L 55/02718 181/239
3,545,492 A * 12/1970 Scheid, Jr. ........ F16L 55/02718 138/44

(Continued)

FOREIGN PATENT DOCUMENTS

EP 3692264 A1 8/2020
GB 489114 A * 7/1938 ............. F01N 1/003

(Continued)

OTHER PUBLICATIONS

Dupont et al., "A microstructure material design for low frequency sound absorption", Applied Acoustics, dated Oct. 19, 2017, in 8 pages.

(Continued)

*Primary Examiner* — Jeremy A Luks
(74) *Attorney, Agent, or Firm* — Procopio, Cory, Hargreaves & Savitch LLP

(57) ABSTRACT

An acoustic dampener for a duct carrying an acoustic signal, the acoustic dampener comprising a plurality of laminar surfaces stacked on top of one another and separated from one another, thereby creating a stack, wherein the plurality of laminar surfaces include a front laminar surface and a back laminar surface, a hole arranged in each of the plurality of laminar surfaces, and in the front laminar surface wherein the hole has dimensions enabling a duct carrying an acoustic signal, to be connected to the acoustic dampener and clamping means for clamping together the front laminar surface, the stack of plurality of laminar surfaces and the back laminar surface to create an acoustic dampener.

15 Claims, 11 Drawing Sheets

(56) References Cited

Figure 1:
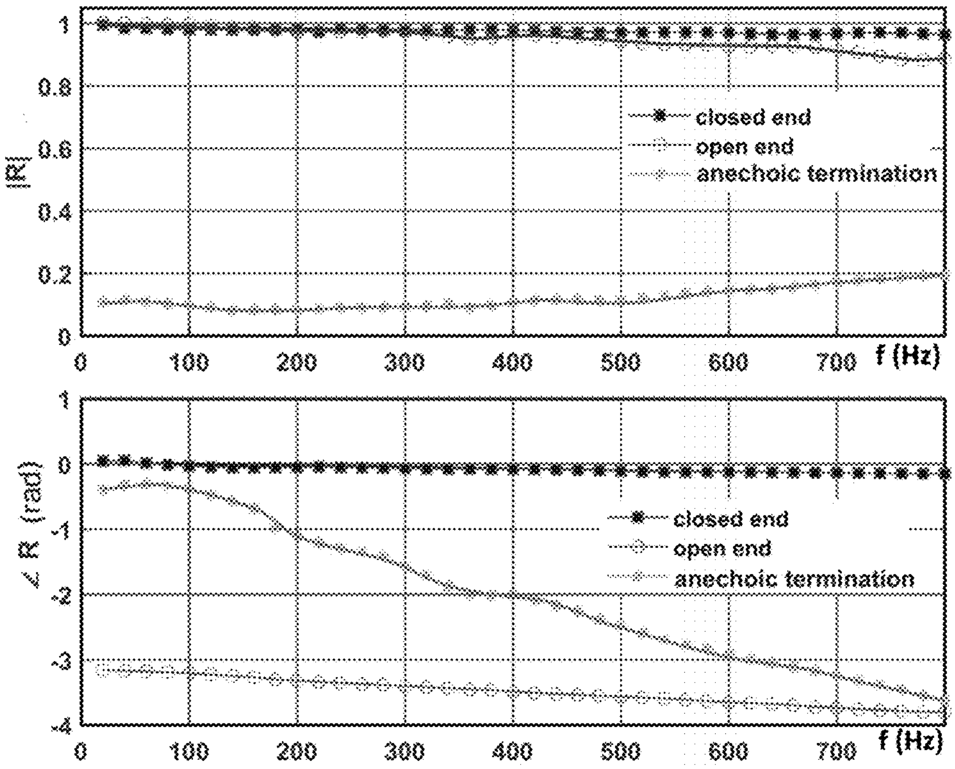

U.S. PATENT DOCUMENTS 3,584,701 A 6/1971 Freeman
4,093,110 A * 6/1978 Johnson .................... B25C 1/18 181/243
4,113,050 A * 9/1978 Smith ....................... F01N 1/10 138/41
4,164,265 A * 8/1979 Kucharczyk ............ F24F 13/24 454/906
4,204,586 A * 5/1980 Hani .................. F02M 35/1211 181/269
4,356,843 A * 11/1982 Baumann ................ F16K 47/08 428/137
4,375,841 A * 3/1983 Vielbig ................... F01N 1/083 181/272
4,751,980 A * 6/1988 DeVane .................. F01N 1/125 181/239
5,326,317 A * 7/1994 Ishizu ................... F04D 29/665 454/906
5,327,941 A * 7/1994 Bitsakis .................... F15D 1/02 138/44
8,256,571 B1 * 9/2012 Butler ..................... F01N 1/083 181/275
8,307,943 B2 * 11/2012 Klasing ..................... F02C 6/08 138/40
9,534,725 B1 * 1/2017 Tecson ................... G05D 16/02
10,208,880 B2 * 2/2019 Masias ................. G10K 11/161
10,480,668 B2 * 11/2019 Baxter .................. B60P 3/2235
11,261,999 B2 * 3/2022 Tecson .............. F16L 55/02718
11,282,491 B2 * 3/2022 Diaz ................. F16L 55/02718
2008/0164090 A1 * 7/2008 Wang .................... E04B 1/8209 181/198
2009/0308686 A1 * 12/2009 Sullivan .................. F01N 1/003 181/255
2017/0205015 A1 * 7/2017 Tecson ................. G10K 11/161
2019/0005938 A1 1/2019 Naya et al.
2019/0035377 A1 1/2019 LeClaire et al.
2019/0080677 A1 * 3/2019 Magyari .............. G10K 11/168
2021/0183348 A1 * 6/2021 Diaz .................... G10K 11/168

FOREIGN PATENT DOCUMENTS

WO WO-9709527 A1 * 3/1997 ........... F01N 13/007
WO 2019/068323 A1 4/2019

OTHER PUBLICATIONS

Patent Cooperation Treaty, International Search Report, Application No. PCT/NL2022/050159, dated Jun. 9, 2022, in 3 pages.

* cited by examiner (a) (b) (c)

ANECHOIC TERMINATION FOR ACOUSTIC PLANE WAVE SUPPRESSION

CROSS-REFERENCE TO RELATED APPLICATIONS

This application is US National Stage of International Patent Application PCT/NL2022/050159, filed Mar. 23, 2022, which claims benefit of priority from Dutch Patent Application NL2027816, filed Mar. 23, 2021 and Dutch Patent Application NL2027840, filed Mar. 25, 2021, the contents of both of which are incorporated herein by reference.

TECHNICAL FIELD

The present disclosure generally relates to the field of acoustics and more specifically to the field of anechoic duct terminations.

BACKGROUND

The need for the anechoic termination has stimulated the development of numerous devices that provide a different level of performance and operate in a specific frequency range. The basic design solutions of low-reflecting terminations may include:

1) duct area expansion, (this relates to all kinds of horns with a gradual or stepwise increase of the wave front area);
2) use of acoustic absorbing materials (fibrous, porous, reticulated, micro-perforated, etc.);
3) so-called “acoustic black hole” based constructions (typically consisting of a range of discs with holes of decreasing diameters separated by cavities).

For some special cases (for instance, for the installation of a microphone in a probing pipe) just a sufficiently long (some meters) flexible hose can be used. Another special case to mention is the assembly of multiple resonators connected to the end of the ducting. A practical example of this kind of termination is the construction of an air inlet tube (so-called “snorkel”) in some domestic boilers. A special class of anechoic terminations is based on the principle of active control (cancelation) using an external sound source, sensors, and corresponding control algorithm. The practical implementation of the low-reflecting terminations usually combines several of the above-mentioned design principles.

In spite of numerous proposed constructions, the problem to provide a compact, robust, and well performing termination which works in a wide frequency range is still actual. This is especially problematic if the low-frequency range is considered. The crux of the problem is related to the difficulty to efficiently absorb or radiate waves of long wavelengths. For the horn-type constructions, both the length and the horn outlet perimeters become cumbersome and unpractical when one aims to radiate waves with frequencies, i.e. below ~100-150 Hz. For some typical designs of acoustic black hole based constructions, the size increase in the transversal directions can be avoided, but the length of the termination may need to be increased to achieve sufficient absorption in the low frequency range. Furthermore, the dependence of the reflection coefficient on the frequency is quite jugged. A similar problem of long or bulky terminations is faced when the termination uses acoustic absorbing material. The absorber layer thickness (or back cavity depth) should be increased to become comparable with a halve or a quarter of the targeted wavelength. In the frequency range below 100 Hz, it leads to the constructions of the typical size of meters.

DESCRIPTION

A low-reflecting duct termination which performs in the low frequency range (measured here in the range 20-800 Hz) is provided, constructed, and tested. The application principle is considered, namely, when the device is connected to the end of the duct which should be terminated it provides low-reflecting acoustic properties in a wide frequency range.

In a first aspect of the present invention, there is presented an acoustic dampener for a duct carrying an acoustic signal, the acoustic dampener comprising a plurality of laminar surfaces stacked on top of one another and separated from one another, thereby creating a stack, wherein the plurality of laminar surfaces include a front laminar surface and a back laminar surface, a hole arranged in each of the plurality of laminar surfaces, and in the front laminar surface wherein the hole has dimensions enabling a duct carrying an acoustic signal, to be connected to the acoustic dampener, clamping means for clamping together the front laminar surface, the stack of plurality of laminar surfaces and the back laminar surface to create an acoustic dampener.

The plurality of laminar surfaces may be stacked such that an air gap is formed between the plurality of laminar surfaces. The air gap may be formed by utilizing separation means. The skilled person is aware of various options available to stack such a plurality of laminar surfaces and to create the stack in such a way that an air gap is formed. For example, spacers may be used in between the plurality of laminar surfaces. Alternately dimples and/or riblets may be formed on the surface of the plurality of laminar surfaces. Alternately, a clamping mechanism, such as screw may serve as the separation means themselves. The skilled person is also capable of combining one or more of the above mentioned features together to achieve the desired effect.

The core element of the termination consists of a “stack of plates” that may be separated by separation means. The construction of the termination is compact, light, cheap, and it can be readily produced and used in any acoustic and/or combustion related industry. On the basis of the systematic experimental parametric study and by using finite element simulation software COMSOL, the optimal set of parameters is outlined. It is found that the main parameters are: the plates’ size, the inter-plate space, the number of plates, and the boundary condition of the periphery of the stack. The roles of plates’ material and thickness are found to be of the secondary order of importance.

The separation means can be for example, thin plastic or metallic spacers. Alternately, the desired separation can be achieved by means of small protrusions on each of the laminar surfaces. Such protrusions may be referred to as dimples or riblets.

Figure 17:
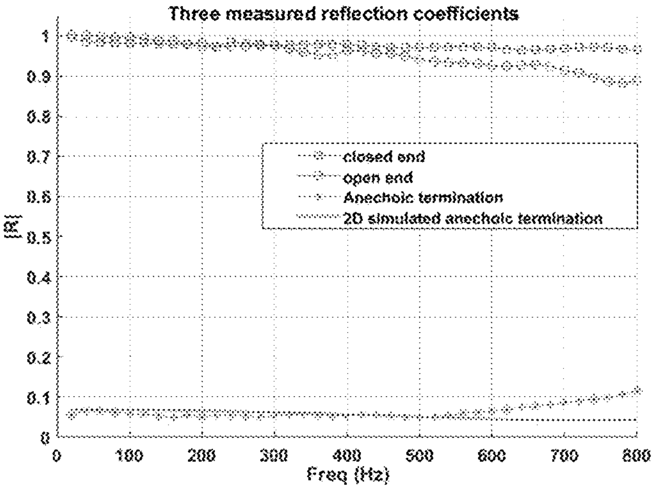

The particular design of the invented device allows to reach reflection coefficients (R) less than 0.1 in the frequency range [20-800 Hz] as presented in FIG. 17. In other words, the absorption coefficient ($\alpha=1-R^2$) would be 0.99, while for the frequencies lower than 500 Hz, it is higher than 0.995. In this example, the set of construction parameters is adjusted to get a possibly flat dependence of reflection coefficient magnitude, $|R|$, with respect to the frequency. One can see that an effective low-reflecting termination is achieved in a wide frequency range, including the very low frequency limit (20 Hz). To give an impression of the device size, the termination for ducting of diameter of 50 mm can as small as 75×75×40 mm. The construction and manufacturing of the termination are relatively simple, and the used materials are widely available. Therefore, this type of device can be attractive for applications where low-reflecting, compact, and cheap duct termination is needed.

The principle constituting unit of the present disclosure is a stack of thin, flat plates separated by the air/fluid gaps of the predefined thickness provided by spacers. Each plate has an inner hole with diameter equal to the diameter of the duct which should be terminated. FIG. 2(*a*) shows the sketch of the cross-section of the stack. The stack is completed by a rigid blind plate at one side forming the closed end. The other side is intended for connection to the ducting. The periphery side of the stack is exposed to the open atmosphere or to the closed box with particular sizes.

This is the principal design which will be referred below to explain the construction and was used for most of the experimental and modelling investigations of the termination performance in the field of parameters of the construction. However, the plates can be replaced by, for instance, truncated cones (cups), helical strip, or other means to provide multiple thin gaps between solid surfaces with the possibility of expansion of the wave front propagating between the surfaces. Such constructions are also described in this application.

In this particular design to fix the thickness of the air gap between the sheets, spacers are used. The spacers are strips of precise thickness metal sheets. For each of the inter-plate layers, some strips are radially positioned as shown in FIG. 2(*a*).

The thin plates and two cover plates should be clamped together. One way to do this is to provide in the corners of the stack, 4 or 8 holes to accommodate the fixation bolts. The top and bottom plates provide a uniform distribution of the pressing force. The holes can be made only for thick plates as well. The sandwich of thin plates with spacers and two thick plates as covers is clamped together using bolts and nuts. Even using metal spacers with precise thickness, the exact value of the air gap thickness may vary depending on the applied pressing force (the bolts with nuts tightening degree). The actual gap width is evaluated and adjusted by measuring the thickness of the complete sandwich, extracting the sum of thicknesses of all plates, and dividing this by the number of gaps. The fine tuning of the air gap can be done by adjusting the tightening till the actual gap width approaches the nominal thickness of the spacers. Other ways to provide proper spacing is to make dimples or riblets on the plates' surface.

The feature which makes the stack performing as an acoustic non-reflecting termination may be the proper combination of the design parameters. The list of design parameters includes: 1) the number of plates; 2) the thickness of the air gap between plates; 3) the thickness of the plates; 4) the inner hole and outer dimension of the plates; 5) the material of the plates.

Figure 2A:
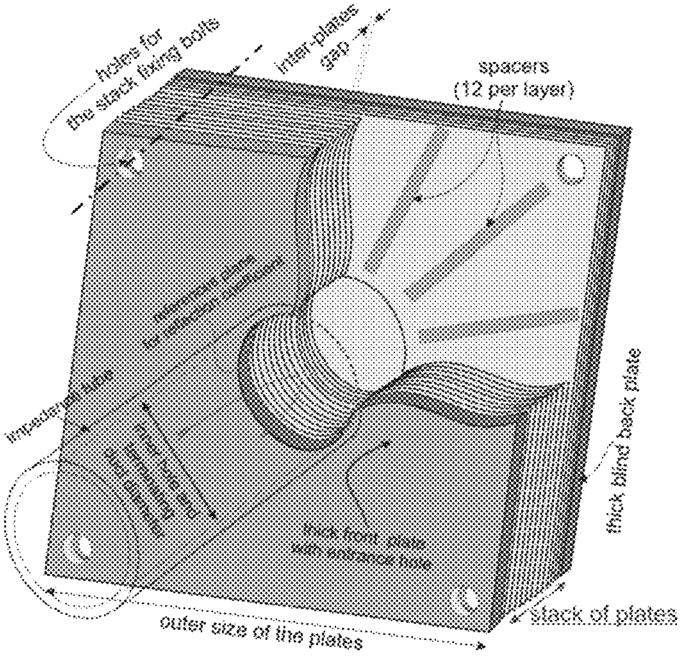
Figure 2B:
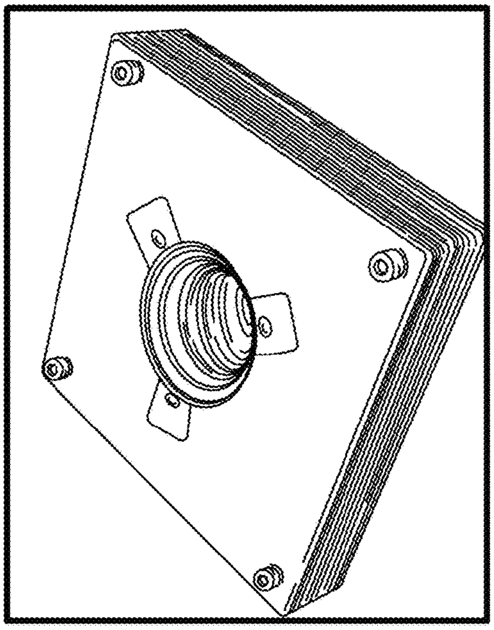

To provide a particular example, the termination performing as one presented in FIG. 2*a* has the following parameters: inner hole (diameter of terminated ducting) is 50 mm; outer size is 75×75 mm; thin steel plates have a thickness of 0.25 mm; air gaps width (thickness of the spacers) is 0.10 mm; and number of plates is 100.

The design of a low-reflecting duct termination which performs in the low frequency range (20-800 Hz) is proposed, constructed, and tested. The core element of the termination consists of a "stack of plates" separated by thin spacers. The construction of the termination is compact, light, cheap, and it can be readily produced using conventional manufacturing technologies and standard materials. The design is described in detail which allows reproduction of the termination in any acoustic laboratory. The systematic parametric study of the termination is performed both experimentally and numerically by using finite element simulation software, COMSOL. On the basis of the conducted study, the optimal set of parameters is outlined. Some design rules are also proposed. The physical mechanisms governing the processes providing the performance of the termination are determined. For this purpose, a range of numerical experiments aiming to elucidate the relative role of different phenomena is conducted. It is found that the main relevant effects include: viscous losses in the thin slots between the plates; expansion of the wave front in the inter-plate space; reflection from the periphery of the stack. The roles of plates' material, thickness, and acoustic radiation from the outer edge of the stack plates are found to be of secondary order of importance.

A construction that provides a low-reflecting termination of the duct is a device of general need in the practice of acoustic laboratories. Many types of acoustic measurements become much easier, or even only possible, when one can provide anechoic terminations in some parts of the measurement setup. The typical application of this kind of termination is the measurement of acoustic power radiated into the duct, or transmission losses in mufflers using the impedance tube technique. Another prospective application of the low-reflecting duct termination is the stabilization of self-excited (autonomous) oscillations which can arise in systems with so-called dependent acoustic sources.

Thermo-acoustically unstable appliances (like combustors, heaters, heat exchangers, etc.) or aeroacoustically unstable systems (like a pipeline with side branches, ventilation ducting, etc.) are a few examples to mention. In general, low-reflecting boundaries allow suppression of the duct eigenmodes which can be advantageous in many cases of practical interests. The need for the anechoic termination has stimulated the development of numerous devices which provide a different level of performance and operate in a specific frequency range. The basic design solutions of low-reflecting terminations include: 1) duct area expansion, (this relates to all kinds of horns with a gradual or step-wise increase of the wave front area); 2) use of acoustic absorbing materials (fibrous, porous, reticulated, micro-perforated, etc.); 3) so-called "acoustic black hole" based constructions (typically consisting of a range of discs with holes of decreasing diameters separated by cavities). For some special cases (for instance, for the installation of a microphone in a probing pipe) just a sufficiently long flexible hose can be used. Another special case to mention is the assembly of multiple resonators connected to the end of the ducting. A practical example of this kind of termination is the construction of an air inlet tube (so-called "snorkel") in some domestic boilers. A special class of anechoic terminations is based on the principle of active control (cancelation) using an external sound source, sensors, and corresponding control algorithm.

The practical implementation of the low-reflecting terminations usually combines several of the above-mentioned design principles. In spite of numerous proposed constructions, the problem to provide a compact, robust, and well performing termination which works in a wide frequency range is still actual. This is especially problematic if the low-frequency range is considered. The crux of the problem is related to the difficulty to efficiently absorb or radiate waves of long wavelength. For the horn-type constructions, both the length and the horn outlet perimeters become cumbersome and unpractical when one aims to radiate waves with frequencies below ~100-150 Hz. For some typical designs of acoustic black hole based constructions, the size increase in the transversal directions can be avoided, but the length of the termination has to be increased to achieve sufficient absorption in the low frequency range. Furthermore, the dependence of the reflection coefficient on the frequency is quite jugged. A similar problem of long or bulky terminations is faced when the termination uses acoustic absorbing material. The absorber layer thickness (or back cavity depth) should be increased to become comparable with a halve or a quarter of the targeted wavelength.

The design of the termination considered in the present disclosure allows to reach reflection coefficients as the one presented in FIG. 1. The device of this particular example has the size of a pocketbook (150×150×50 mm) which is made to terminate a duct with a diameter of 50 mm. In this example, the set of construction parameters is adjusted to get a possibly flat dependence of reflection coefficient magnitude, |R|, with respect to the frequency. One can see that an effective low reflecting termination is achieved in a wide frequency range, including the very low frequency limit (20 Hz). The construction and manufacturing of the termination are relatively simple, and the used materials are widely available. Therefore, this type of device can be attractive for applications where low reflecting, compact, and cheap duct termination is needed.

This contribution aims to introduce the idea of how to design this low-reflecting duct termination, evaluate its performance in the field of parameters of the construction, elucidate involved governing physical phenomena, and suggest design rules which may facilitate the design and development of similar devices.

In the remaining part of this description, the layout, construction steps, and some practical recommendations on how to reproduce this termination are given. Next, the results of a parametric study aiming to elucidate the effects of different constructive parameters on the termination performance are presented. The research is performed using both experimental and numerical modeling approaches. Accordingly, the approach to model the termination using the commercial software "COMSOL Multiphysics®" is described. Physical experiments are served as primary validation of the numerical model and also as post-check of the output of the numerical optimization of the design. Furthermore, the numerical model is used to get information regarding leading physical phenomena which determine the performance of the termination. For this aim, the model is purposely modified either by changing the design of the termination or by (in)ex-cluding some of the physics from/to it and checking caused effects.

Design of the "Stack of Plates" Type of the Low-Reflecting Duct Termination

The principle constituting unit of the proposed design of the termination is a stack of thin, flat plates separated by the air gaps of the predefined thickness provided by spacers. Each plate has an inner hole diameter equal to the diameter of the duct which should be terminated. FIG. 2(*a*) shows the sketch of the cross-section of the stack and FIG. 2(*b*) is a photo of the practical realization of the termination.

The stack is completed by a rigid blind plate at one side forming the closed end. The other side is intended for connection to the ducting. The periphery side of the stack is exposed to the open atmosphere.

As presented below, this design is used for most of the experimental investigations of the termination performance in the field of parameters of the construction. The list of design parameters includes: 1) the number of plates; 2) the thickness of the air gap between plates; 3) the thickness of the plates; 4) the outer dimension of the plates; 5) and the material of the plates.

The physical experiment results reported here are restricted to the variations of only the two first parameters from the list. The plates' sizes are fixed to a thickness of 0.25 mm and the square outer shape of 150 by 150 mm. The inner hole diameter is 50 mm and it matches the diameter of an impedance tube used to measure the reflection coefficient. The plates' material is stainless steel EN 1.4301.

Accordingly, variable parameters in the physical experiments are the air gap thickness and the number of sheets in the stack. In contrast, the numerical experiments explore variations of other design parameters. It is worth mentioning that, although not discussed here, stacks of other dimensions i.e. made from the plates with different outer sizes, shape (circular), thickness, material (plastic), etc. have also been manufactured and tested. Furthermore, stacks of truncated cones (cups) have been built as well, which can be optimized to perform well. To fix the thickness of the air gap between the sheets, spacers are used. The spacers are strips of a precise thickness metal sheets cut to the size of 50×5 mm. For each of the inter-plate layers, 12 strips are radially positioned as shown in FIG. 2(*a*). In the corners of the square plates, 4 holes with a diameter of 6 mm are made to accommodate the fixation bolts. The top and bottom plates are made from thick (4 mm) metal sheets to provide a uniform distribution of the pressing force. The sandwich of thin plates with spacers and two thick plates as covers is clamped together using 4 bolts and nuts of 5 mm, see FIG. 2. Even using metal spacers with precise thickness, the exact value of the air gap thickness may vary depending on the applied pressing force (the bolts with nuts tightening degree). The actual gap width is evaluated and adjusted by measuring the thickness of the complete sandwich, extracting the sum of thicknesses of all plates and dividing this to the number of gaps. The fine tuning of the air gap is done by adjusting the tightening till the actual gap width approaches the nominal thickness of the spacers.

Measurement Setup

The performance parameter which is measured is the frequency dependence of the reflection coefficient of the termination $R(f)$ evaluated at the plane of its connection to a duct. To measure the reflection coefficient the conventional technique of the impedance tube is applied. The used impedance tube is of 1.00 m length aluminum, thick (30 mm) wall tube supplemented by 6 of ¼ inch microphones installed flash to the inner channel of the tube. The spacing between the microphones is uniform and is equal to 170 mm. The microphones were calibrated for the (relative) phase and amplitude matching.

The external excitation is provided by a loudspeaker connected to one end of the impedance tube. The purely sinusoidal probing signals are formed by the output channel of a data acquisition card (DAQ) and amplified by the sound frequency amplifier. The data from the microphone array is collected by the same DAQ and postprocessed.

The frequency range from 20 to 800 Hz is scanned with a step size of 20 or 10 Hz. The lowest frequency is limited by the capability of the loudspeaker, the highest one is defined by the selected spacing between the measurement microphones. The amplitude of the excitation signal is monitored using the output of the closest microphone to the measured object and it is automatically adjusted for each probing frequency to the predefined level. The linearity of the measured reflection coefficient is checked by testing at twice lower and twice higher values (compared to the nominal one) of the perturbation amplitudes and ensuring the amplitude independence of the measured value of |R|. The measurement procedure and data processing were automated using a software code written in LabVIEW. The data processing method is straightforward, and its outline is the following. The microphone time series data are first converted via FFT to the frequency domain. Next, two unknowns, namely the excitation (forward) and reflected (backward) propagating waves are calculated by solving the overdetermined system of 6 equations for pressures at the microphones' positions and finally, the reflection coefficient is defined as the ratio of the reflected to the corresponding stimulus waves taken at the plane of the termination/stack inlet.

The accuracy of measurements can be judged from the data presented in FIG. 1 for the closed and open-end terminations of the impedance tube. One can see that an accuracy of a few percent can be reached for the frequency range of interest. More technical details related to the impedance tube and data processing can be found in relevant prior art documents.

Numerical Model Setup in "COMSOL Multiphysics®"

The numerical model of the termination is developed using the COMSOL Multiphysics® software. Various modules are available in COMSOL which makes it a useful tool to combine acoustics in free space, acoustics in thin layers, structural mechanics, etc.

Figure 3:
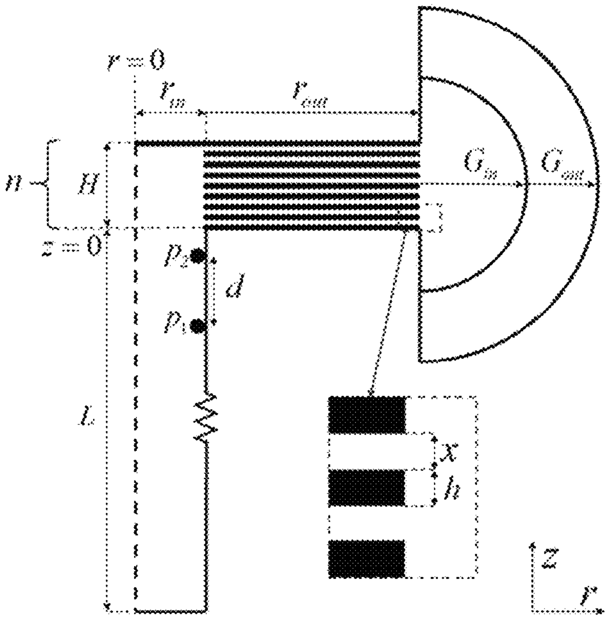

FIG. 3 shows a schematic view of the geometry of the base modeling configuration with related symbols which are explained in Table 1. This model represents closely the design of the experimentally evaluated termination and measurement environment. The geometry can be divided into three domains: the impedance tube, a stack of plates, and surroundings described in the following.

TABLE 1

Symbols and names in the model.

| Symbol | Model parameter |
|---|---|
| L (m) | Tube length |
| H (m) | Total stack height |
| x(mm) | Inter-plates spacing/gap height |
| h(mm) | Plates' thickness |
| n | Total number of plates in the stack |
| $r_{in}$(m) | Radius of inner hole in plates |
| $r_{out}$(m) | Outer radius of plates/disks |
| $G_{in}$(m) | Inner radius of PML |
| $G_{out}$(m) | Outer radius of PML |
| $p_1$(Pa) | Acoustic pressure at point 1 |
| $p_2$(Pa) | Acoustic pressure at point 2 |
| d(m) | Distance between points 1 and 2 |

In a Cartesian coordinate system, the termination made from square plates is symmetric in the YZ and XZ planes. However, the reproduction of this design for the simulation still requires a 3D model which takes more computational time than a simple 2D axisymmetric model. To decrease the computational cost and simplify the model, it is decided to model the muffler as an axisymmetric one. This is achieved by modeling the square plates as circular discs with equal area. This similarity guess is motivated by the idea that the thermo-viscous effects in the inter-plate space are proportional to the surface area (or volume) of the boundary layer. At the same time, the introduced difference for the outer side surface (the radiating one) of the stack is minor. The validity of these approximations is checked via a posteriori comparison of the experimental results with the results of the modeling. Furthermore, a limited set of calculations is performed using a 3D model, which reproduces closely the square geometry of the plates/stack. As will be shown below, the observed difference between the 3D and the axisymmetric 2D models, adjusted for equal plates' surface areas, is minimal.

Therefore, the axisymmetric geometry of the termination and its installation to the impedance tube is implemented in the model.

Impedance Tube Sub-Model

Part of the impedance tube with the same dimensions as in the experiment is modeled. The tube walls are of sufficient thickness such that they can be assumed to be rigid. Therefore, only the acoustic domain is modeled. The incident planar wave starts at the bottom of the tube in FIG. 3 and propagates longitudinally along the positive z-axis. In order to obtain the reflection coefficient, pressure measurements at two locations in the tube (indicated by p1, p2 in FIG. 3) are sufficient. The reflection coefficient is calculated using the known equation below from the post-processed results of the simulation, $$R = \frac{\frac{p_2}{p_1} - e^{ikd}}{e^{ikd} - \frac{p_2}{p_1}},\ i = \sqrt{-1}, \tag{1}$$

where k is the wavenumber, and d is the distance between the two microphones. The phase of the reflection coefficient is corrected to translate the reference/measurement plane to the position at the entrance of the stack of plates.

Stack of Plates Sub-Model

The base model of the stack of plates assumes no interaction between the acoustic wave and the structural mechanics of the plates. The plates are assumed to be rigid with a certain thickness h. The acoustic domain consists of n−1 circular ducts (inter-plate air gaps) with outer radius $r_{out}$ and inter-plates gap height x. The distance between consecutive gaps is equal to the plate's thickness. Material properties of the plates are not taken into account, and the mesh is only applied to the acoustic domain, reducing the computational cost significantly.

Stack Surrounding Sub-Model

The experiments of the muffler were performed in a semi anechoic chamber and it can be assumed that the outgoing waves do not produce reflections. This feature should be included in the model to resemble the practical setup accurately. Modeling the complete surrounding is not practical and would result in solving unnecessary Degrees of Freedom (DOF). The use of an artificial domain is made to reduce the computational cost. The function of the artificial domain is to absorb the waves without producing reflections. This domain is called a 'Perfectly Matched Layer' (PML). The PML is not a boundary condition in the model, but rather an extra domain which absorbs the incident waves. In FIG. 3, the PML consists of the outer layer of the semi-circle. The inner layer domain is a free space at the exit of the stack of discs. The layer thickness, $G_{out}$–$G_{in}$, absorbs the wave, and produces no reflection.

The PML applies a coordinate transformation which can be found in the COMSOL documentation for the Acoustics module. The thickness of the layer should be large enough and meshed symmetrically with a sufficient resolution such that all wavelengths can be resolved. Scaling factors allow the PML to function properly with fewer mesh elements and therefore reduced computational cost. The scaling factors in the model have been determined through tuning, to find the optimum absorbance for each wavelength in the frequency domain. The reflection of the PML is theoretically zero. However, some reflection is still possible due to the discretization of the mesh.

The geometry of the surrounding consists of a semi-circle divided into two layers. The circle has an offset radius $r_{out}$ and is located at the periphery of the discs. The z-coordinate of the center of the circle is located at half the stack height, H, resulting in symmetric outlet conditions for the propagating waves. When the model is simulated for a combination of multiple parameters, such as plate's thickness and spacing, the PML is updated and scaled to fit the criteria described above.

Figure 4:
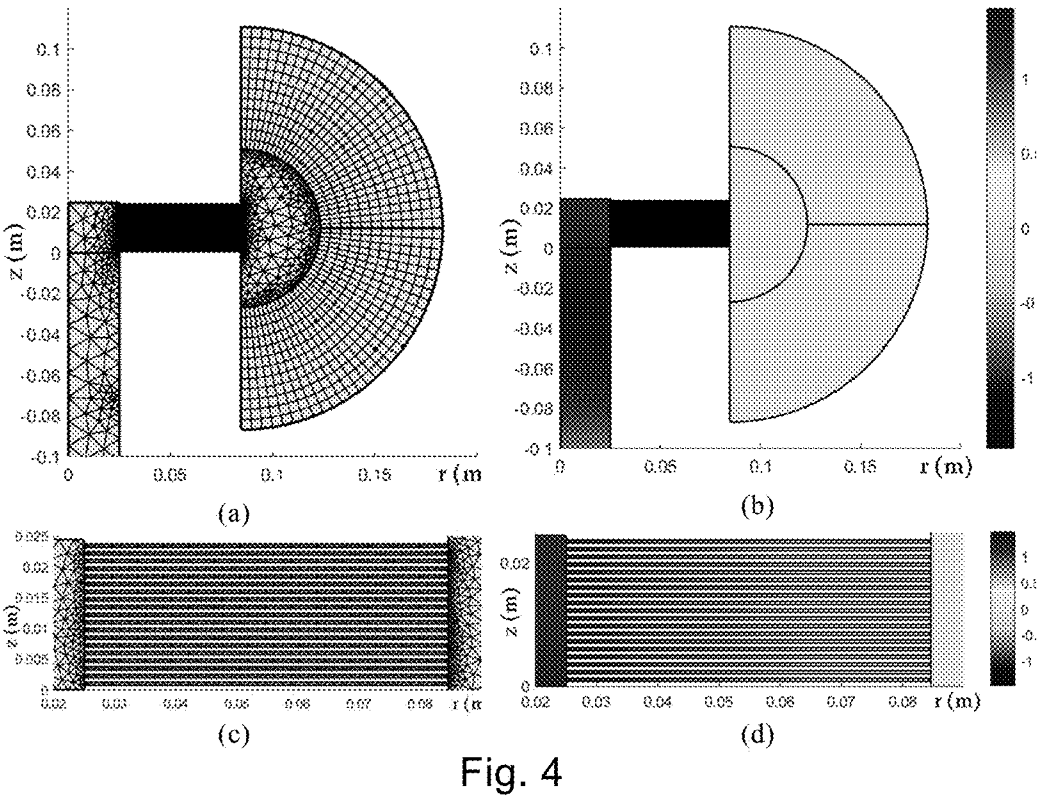

FIG. 4(*a*) gives an example of the model geometry meshing with focus on the stack region in FIG. 4(*c*). FIG. 4(*b*) shows a typical view of the distribution of acoustic pressure amplitude within the geometry and inside the stack (FIG. 4(*d*)).

To elucidate the relative role of different physical phenomena and design parameters on the performance of the low-reflecting terminator, dedicated changes in the model geometry, boundary conditions, and modeled physics are implemented. These modifications are applied on top of the base model described above. The details of the changes will be explained later when the corresponding numerical experiments will be discussed.

Systematic Parametric Investigation of the Performance of the Termination

The results of the reflection coefficient measurements from the terminating device allow to make the following conclusions related to several aspects:

- Comparing the physical and numerical model results, one may judge the validity of the modeling assumptions and expected accuracy/adequacy of the model output;
- The dependence of the performance on the variation of the construction parameters allows evaluating the sensitivity/robustness of the design to the given parameters. Furthermore, the range of achievable performance and the optimal set of parameters can be evaluated.
- The character of the obtained dependences may suggest the role of different physical phenomena involved in the process.

These aspects are the main targets of the performed parametric study.

Reflection Coefficient Dependence on the Number of Plates and the Spacer's Thickness All tests were performed using a square (150×150 mm) metal plates with a thickness of 0.25 mm. To match the areas of the modeled and physical surfaces, the circular disks with an outer diameter of 169 mm and the same thickness were implemented in the model. The results of the parametric sweep will be presented as a function of the decreasing inter-plate spacing.

Figure 5:
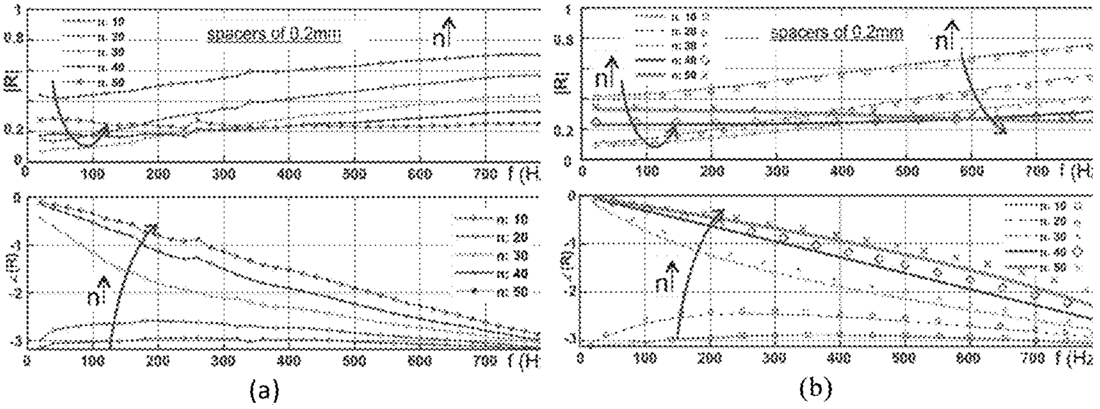

FIG. 5 presents the absolute value and phase of the measured and modeled reflection coefficients vs frequency for varying number of plates in the stack when the inter-plates gap is 0.2 mm. The modeled results are given for both 2D axisymmetric (lines in FIG. 5(*b*)) and 3D square geometries (symbols in FIG. 5(*b*)). A close matching of the 3D and 2D modeling approaches substantiates the use of only 2D results further on.

One can see that by increasing the number of plates the low frequency part (below ~300 Hz) of the frequency dependence of the magnitude of the reflection coefficient first drops and reaches a minimum of |R|~0.1 for a stack of 30 plates and next increases again. The high frequency range (above ~300 Hz) gradually decreases for the stack with increasing number of plates. Looking at the phase of the reflection coefficient one may infer that a stack of 10 plates shows the behavior similar to a closed end (almost zero phase). By increasing the number of plates, the low frequency part of the phase vs frequency plot tends towards the behavior similar to the one of an open-end termination, namely the phase approaches "$-\pi$" at the low frequency limit. All curves for phases gradually decay to "$-\pi$" with the increase of frequency.

Comparing the experimental data with the results of COMSOL modeling within the base model described above, one can see both good qualitative and quantitative correspondence. The model correctly captures the trends of the reflection coefficient dependences on the number of plates both for the phase and amplitude. The quantitative comparison reveals a reasonably high accuracy of correspondence between the experimental and modeling outputs.

Figure 6:
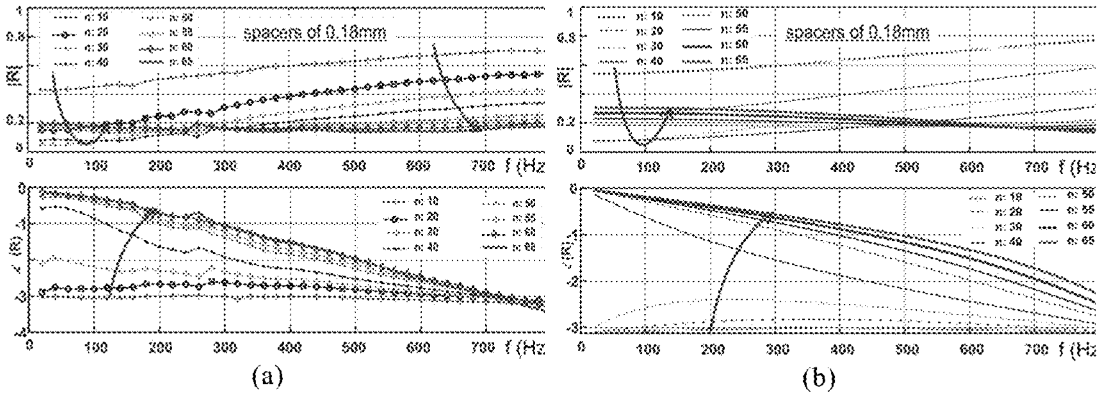

Considering similar test results for an inter-plate spacing of 0.18 mm as presented in FIG. 6, one can see similar qualitative behavior as described above for a spacing of 0.2 mm. Also, the model predictions correctly reproduce the trends and parametric dependencies for both phase and absolute values of the reflection coefficient vs frequency when the number of the plates serve as the variable parameter. However, a quantitative difference between the model and experiments becomes noticeable.

The model slightly over-predicts the absolute value of the reflection coefficient. For instance, at frequencies of 20-80 Hz for n=10 plates, the experiment gives |R|~0.45 but the model predicts |R|~0.55. The reason for the deviation can be both related to the adopted modeling approximations and the finite tolerances of experimentally defined parameters. As will be seen from the results presented below, the reflection coefficient is very sensitive to the width of the inter-plate gaps and even small inaccuracies in the fixation of it may lead to a noticeable variation of the measured reflection coefficient.

Figure 7:
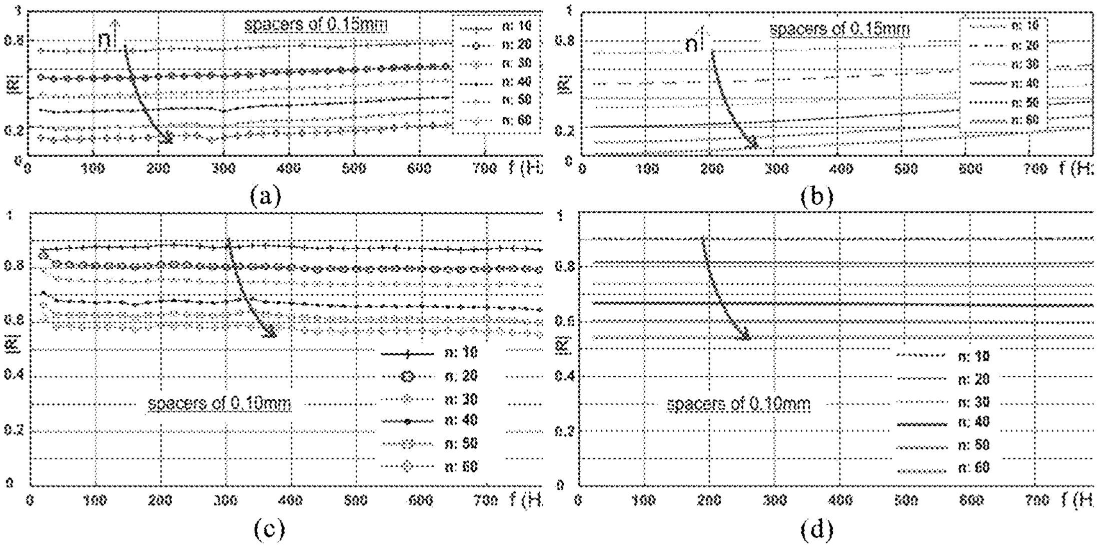

Similar observations can be deduced from the results for a smaller air gap width. FIG. 7 represents the data of |R| for the gaps of 0.15 mm and 0.1 mm. For the case of 0.15 mm the model predicts |R| values of approximately 0.1 smaller than the measured values. The significance of the difference becomes more apparent (in a relative sense) when the tests with a large number of plates are compared. For instance, the predicted reflection coefficient in the range of 20-300 Hz is as small as ~0.05 for the stacks with 60 and 65 plates. The measurements show also small but not so extremely small values of ~0.12-0.15.

The stack with the smallest tested gap of 0.1 mm demonstrates an interesting property of the almost flat (in)-dependence of |R| on the frequency in the tested range. This property and also the effect of the number of plates are both captured by the model. The predictions are qualitatively correct and quantitatively accurate. This fact validates the model and supports the use of the modeling approach for other numerical experiments presented below.

From the presented experimental results a few intermediate conclusions can be drawn. A general conclusion is that the proposed design can provide a broad band low-reflecting duct termination performance in the low frequency range. The performance depends on the number of plates and interpolates distance. Comparison of the experimental and the modeling results signifies that the base model is capable to reproduce both qualitatively and quantitatively the behavior of the reflection coefficient as a function of frequency. The parametric dependencies are also well captured. However, for the cases within a certain range of inter-plate gaps uantitatively the modeling and experimental results slightly deviate from each other.

Additionally, for practical interest, it can be useful to point out that the regular and monotonic effect as function of the number of plates suggests the possibility to design the termination with desirable, almost constant (weakly frequency dependent) reflection coefficient within a wide working range including the low frequency end.

As follows from the presented results, the inter-plate spacing is a crucially important parameter for the anechoic performance of the termination, and therefore it is instructive to plot the data in the form of the reflection coefficient dependence on the inter-plate space for a fixed number of plates.

Figure 8:
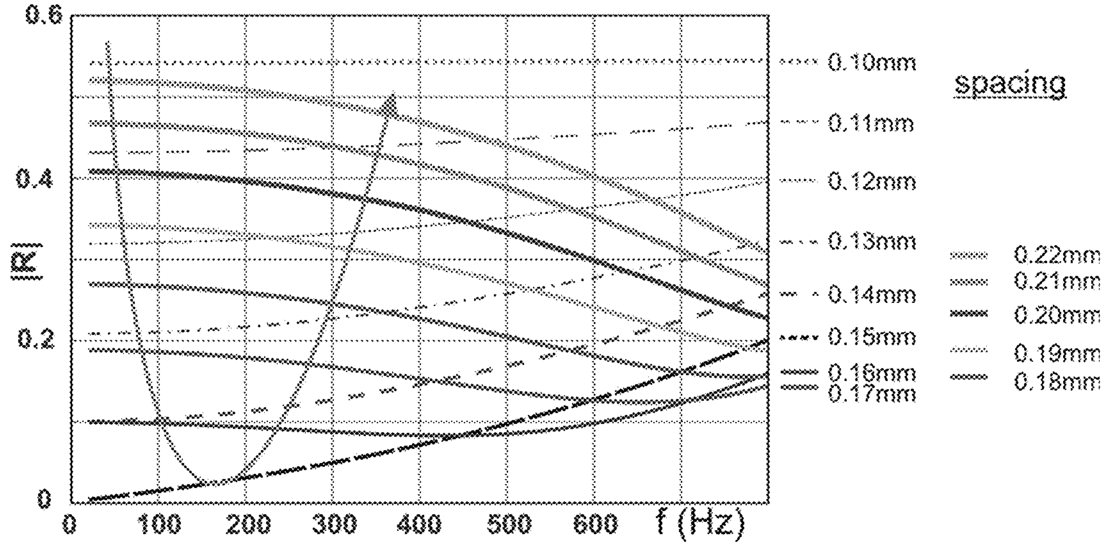

FIG. 8 presents the modeling data for a stack of 60 plates when the inter-plate gap is varied with a fine step.

The results suggest that when aiming at the lowest reflection amplitude, the proper selection of the inter-plate gap is of crucial importance. For the case presented in FIG. 8, the model predicts that if the spacing can be maintained within the range between 0.17 and 0.15 mm, the amplitude of the reflection coefficient will be below ~0.2 in the complete tested frequency range of 20-800 Hz. The experimental results in FIG. 6(*a*) and FIG. 7(*a*) also confirm this conclusion.

In the range close to the optimal spacing, the performance of the stack is very sensitive to the variation of the air gap width. It is technically challenging to ensure a uniform and precise fixation of the inter-plate gap with an accuracy of 10 μm. Therefore, a small deviation of the real value from the nominal one defined by the spacers may explain the noticed above mismatches between the experimental and modeling results in a range of inter-plate gap distances around the optimal value of 0.15 mm.

Reflection Coefficient Dependence on the Outer Size of Plates

The effect of the plate size will also be studied using the numerical results. The data presented in FIG. 9 is calculated for 4 cases of 50 and 60 plates separated by inter-plate gaps of 0.15 and 0.18 mm.

This range is selected because it represents the range close to the optimal value of these parameters when the minimization of the reflection is the target for the plates of 150 by 150 mm. The plate size is varied around this value.

Figure 9:
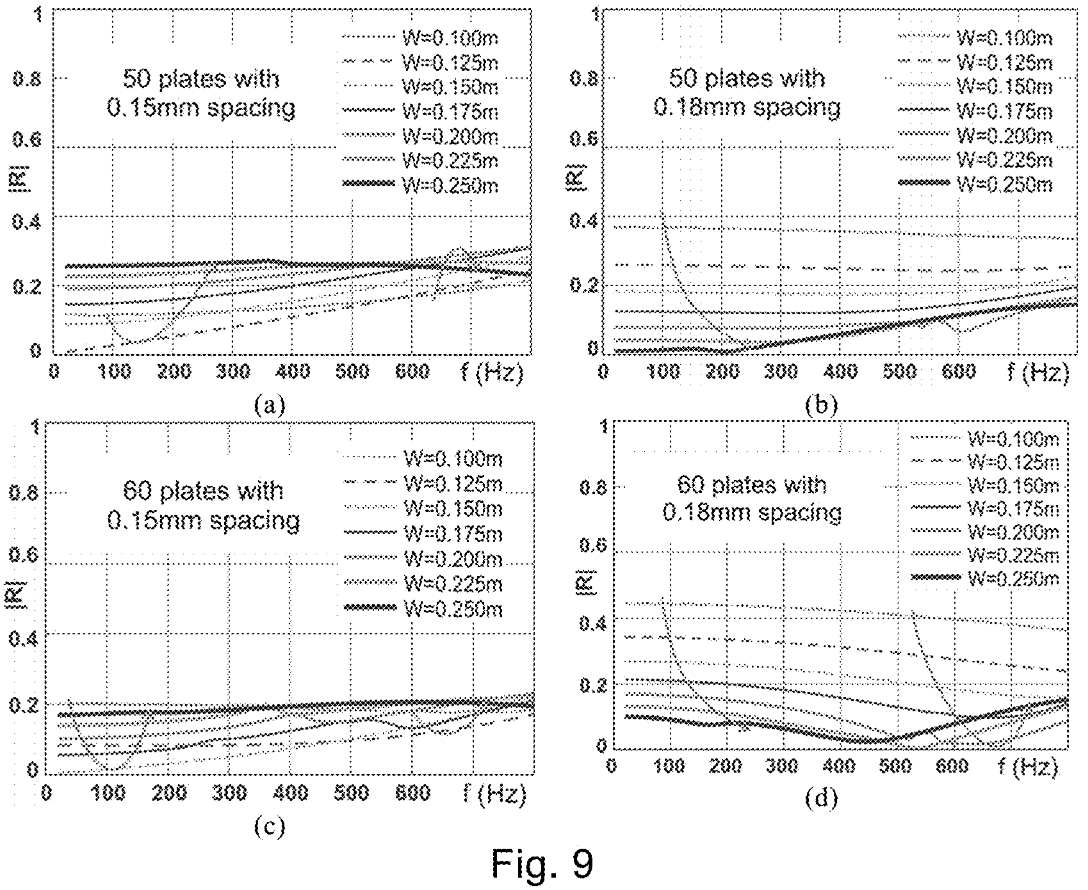

As can be inferred from the modelling results, the external size of the plates plays a noticeable role in defining the performance of the stack, see FIG. 9. Qualitatively the effect is non-monotonic and essentially depends on the combination of other parameters. The figures exemplify the different cases.

For instance, by increasing the plate size, the reflection coefficient can be diminished like in FIGS. 9(*b*) and (*d*). However, in the cases shown in FIGS. 9(*a*) and (*c*) there are optimal plate size values for the given number of plates and inter-plate gap. Furthermore, the trends of changes may vary for different frequency ranges as can be seen in FIGS. 9(*a*), (*c*) and (*d*).

The main conclusion which follows from these numerical experiments is that the reflection from the stack of plates' termination strongly depends on the combination of its geometrical parameters. These parameters are the gap width, the size of the plates, and the number of plates. This dependence can be decoupled hardly into a simple composition of independent effects.

The next technical parameter of which the effect can be checked is the thickness of the used plates. For practical interest, thinner plates result in a lower weight of the stack. Alternatively, if, for example, plastic is selected as the plate's material, it is more practical to use thicker plates to ensure sufficient rigidity of the construction. Therefore, it is useful to get an idea of what kind of effects one may expect when varying the plate's thickness.

Figure 10:
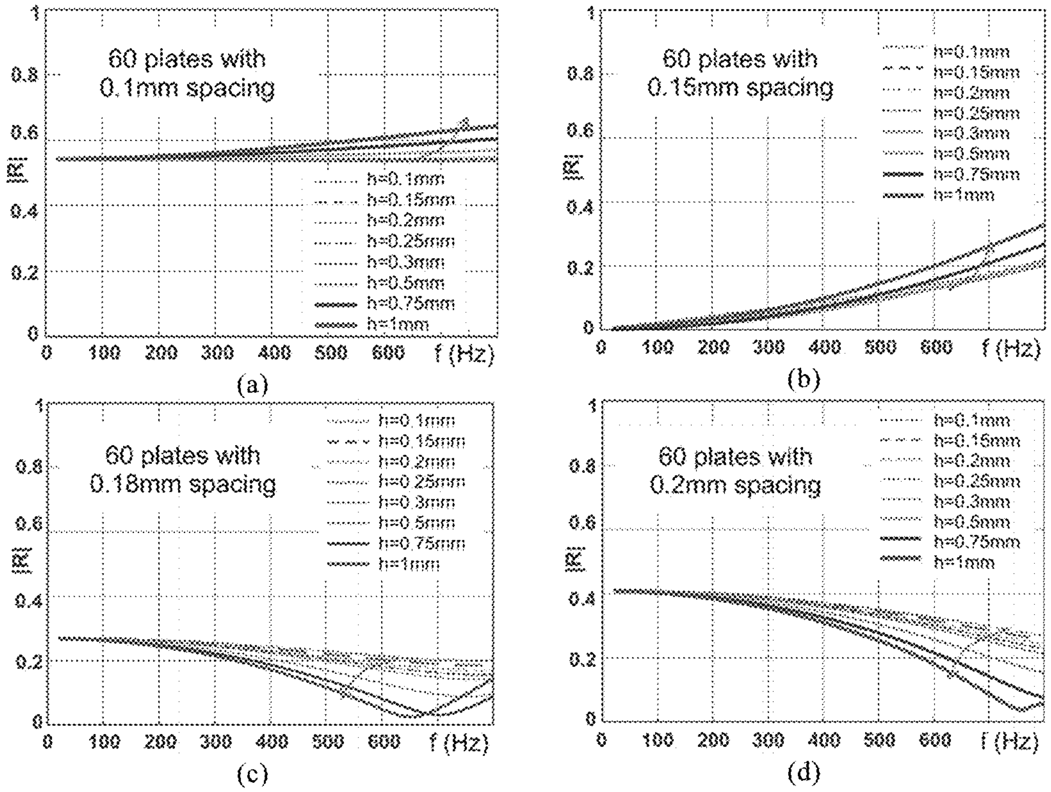

FIG. 10 represents the frequency dependence of |R| for the stack of plates with size 150 by 150 mm for four spacing widths from 0.1 mm to 0.2 mm when the plates' thickness, h, is the variable parameter.

The results show that the variation of the plates' thickness has a relatively weak effect on the stack termination performance. Noticeable differences can be seen at the high end of the studied frequency range and only when the plate's thickness differs by several times (compare the lines which correspond to 0.1 mm vs 1 mm spacing). For the selected example (60 plates of 150 by 150 mm) thicker plates have a slightly higher reflection coefficient in the case of smaller inter-plates gap (case in FIGS. 10(*a*) and (*b*)), but for the larger gap the trend is opposite (see FIGS. 10(*c*) and (*d*)).

The increase of the plate's thickness leads to a proportional increase of the total stack thickness. In this case, the most upstream and downstream plates experience a different phase of pressure wave.

In other words, the stack becomes less "acoustically compact". This effect looks like the most plausible cause of the influence of plate's thickness on the reflection coefficient.

Physical Mechanisms Providing the Performance of the Termination

In this part, the results of numerical experiments will be used to elucidate the relative role of different physical effects. The ultimate goal of this study is to establish the governing physical phenomena which are responsible for the observed acoustic properties of the stack of plates duct termination.

To formulate the range of working hypotheses which can be studied via specially arranged experiments, it is useful to mentally trace the path of propagation and possible reflections of the incoming wave.

1) Crossing the interface between the straight duct (impedance tube in our case) and the inlet of the stack, the wave faces an area jump from the section area of the tube to the sum of gap areas between all plates. This area jump is a possible source of an impedance discontinuity and may cause reflections.
2) Propagation in the inter-plate channels is affected by two effects: 2.1) viscous damping in the near-wall regions; 2.2) wave front expansion due to the increase of the spacing area with the radial wave-front position. Presumably, the interplay of the effects imposed by these two factors plays an important role for the impedance matching.
3) At the open exit edge of the stack, the wave may be partially reflected back and partially radiated to the outside of the stack. Accordingly, the conditions imposed on this boundary may affect the global stack performance.

Via a range of numerical experiments which are performed and presented below, we will propose methods to elucidate the relative role of each anticipated physical phenomenon. The analysis sequence starts with testing the role of the boundary conditions at the exit edge of the stack. Next, we proceed with experiments dedicated to establishing the role of wave front expansion and damping. Finally, the effect of the stack inlet area change (areas ratio) will be studied in combination with a related design optimization issue.

Ideally Reflecting Versus Radiating and Anechoic Conditions at the Stack exit end.

Figure 11:
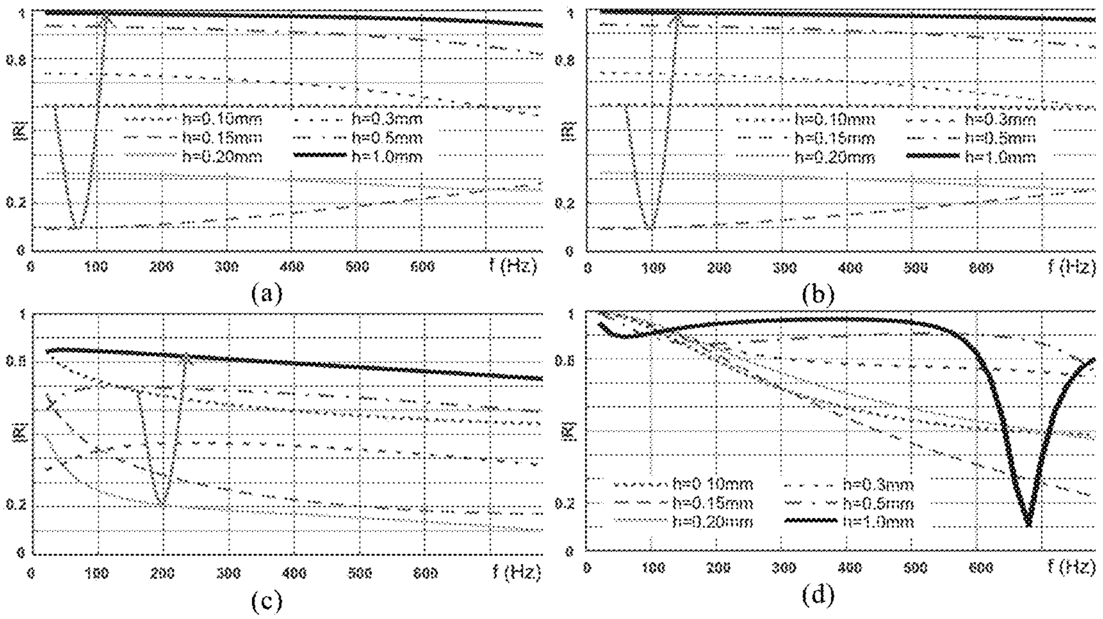

At the base design of the stack of plates, the outer periphery of the stack is open to the ambient atmosphere. Accordingly, both reflection and radiation of the waves occur. To check the role of the boundary conditions imposed here, it is natural to alter them and observe the effects. FIG. 11 shows the comparison of reflection coefficients for the same stack configuration where case in FIG. 11(*a*) corresponds to an open, radiating outer end (base model case), but FIG. 11(*b*) represents the case when the ideal non-radiating boundary is modeled. For the ideal open-end the condition of an acoustic pressure equal to zero is specified at the plates' exit plane.

One can see that the difference between the open radiating and non-radiating cases is minimal. It is even hardly visible when comparing the lines in FIGS. 11(*a*) and (*b*). Most of the numerical tests presented in this contribution and many other configurations of the stack design were checked and the results confirm with high confidence that the reflection coefficient from the stack is marginally affected by the radiation from the stack to the environment.

This situation can happen either if the radiation to the outside of the stack does not contribute noticeably to the physics of the processes inside the stack or if the waves are already attenuated considerably before reaching the plates exit (roughly speaking, waves are vanished before reaching the exit of the plates). To check the last alternative, the boundary condition was changed to test two cases:

i) ideal closed end (acoustic velocity is set to zero at the boundary); and ii) ideal radiation/absorption from/at the boundary, (anechoic boundary condition is imposed at the outer edges of the stack).

This boundary condition ensures that all waves are fully absorbed, and no reflection occurs at the stack exit. FIGS. 11(*c*) and (*d*) present the corresponding results. The last two tests dramatically differ from the two first cases. Therefore, the acoustic boundary conditions are crucially important for the performance of the stack as a low-reflecting termination. However, the phenomenon of sound radiation from the edge of the stack plays only a secondary role. This fact should significantly simplify the future development of an analytical model of the stack of plates termination. Furthermore, the numerical setup also can be simplified as a zone around the stack. The PML can be eliminated and substituted by just an ideal open-end condition.

As a side result, it is worth mentioning that, as follows from the plots in FIG. 11(*d*), the stack of plates will not work if the device will be sealed at its lateral surfaces or confined in a vessel of small volume.

The Role of the Wave Damping in the Narrow Region.

Figure 12:
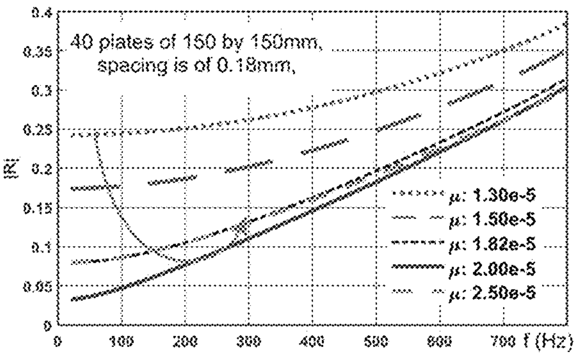

Estimating the thickness of the Stokes boundary layer as $\sqrt{2\upsilon/\omega}$ where $\upsilon$ is the kinematic viscosity and $\omega$ is the angular frequency, one gets values ranging from ~0.5 mm for 20 Hz to ~0.075 mm for 800 Hz. Therefore, for most of the configurations which are under discussion here, the interpolate gap is smaller than the doubled Stokes layer. Accordingly, it is very plausible that the acoustic attenuation in the inter-plates gap is one of the crucial physical phenomena governing the performance of the termination. This conclusion is also supported by the observation of the strong sensitivity of the reflection coefficient to the inter-plate gap width. The dependence of |R| on the plate surface area when either the number of plates or the plates' size are changed also signifies the role of acoustic damping in the thin inter-plates area. However, in these experiments next to the viscous boundary layer volume also other parameters are altered. To perform a "pure" test, one can play with the value of the gas/air dynamic viscosity in the model keeping other parameters intact. The results of such simulations are given in FIG. 12.

The variation of the air viscosity around the nominal value of $1.82\times10^{-5}$ kgm$^{-1}$ s$^{-1}$ leads to a non-monotonic dependence of the reflection coefficient. For this particular case, the combination of parameters is optimal for the lower reflection at the low end of the frequency. Both an increase and decrease of the coefficient of dynamic viscosity lead to an increase of the reflection coefficient. The effect of variation of viscosity is more pronounced at low frequencies and less visible at the high end of the studied frequency range.

From the performed experiment the following can be concluded. Acoustic damping due to the air viscosity and heat conductivity plays an important role in the overall performance of the stack of plate termination. The dependence of |R| on the air dynamic viscosity is nontrivial and its character is interweaved with other parameters of the stack design. This fact adds some extra complexity for design of the device, namely, the performance may deviate for different gases and/or temperatures. This observation also may serve as a good validation test for the evaluation of theoretical (analytical) models.

The effect of the Wave Front Expansion.

Figure 13:
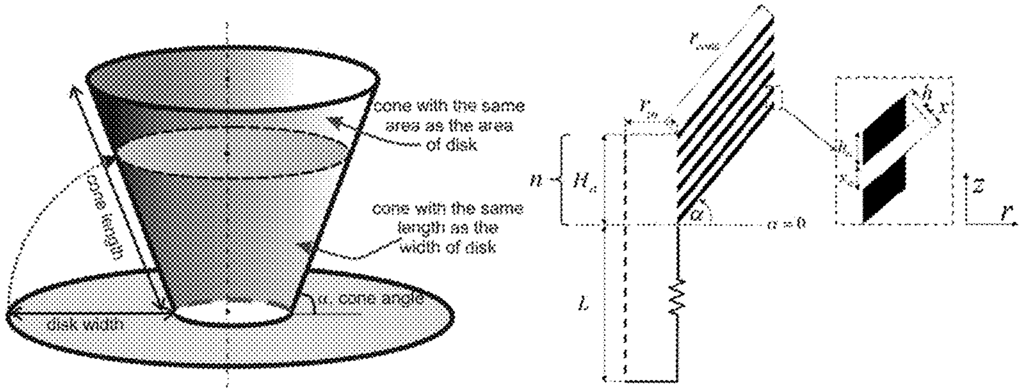

To elucidate the relative role of the wave passage expansion, it is desirable to perform an experiment where the expansion rate can be altered by keeping other essential geometrical parameters as constant as possible. The idea of such an experiment is sketched in FIG. 13 and essentially is the following. By replacing the stack of plane plates by the stack of truncated cones with a certain (variable) slope angle, one gets the possibility to vary the wave front expansion rate while keeping the total stack height $H_\alpha$, the spacing between the plates/cones, and their surface area constant. To retain simultaneously the stack height $H_\alpha$ and inter-cones gap constant, adjustment of the wall thickness of the cones is needed.

From geometrical consideration, if one retains the wall thickness h and changes the cone angle $\alpha$, the stack height $H_\alpha$ will scale with the angle as $H_\alpha=H_0/\cos(\alpha)$, where $H_0$ is the height of the stack of plane plates ($\alpha=0$). For waves propagating between plates/cones, the normal distance between the walls is important so this spacing should be retained as a constant. However, to maintain the stack height independent from the cone slope angle, the cone wall thickness ha should be decreased with $\alpha$ to compensate the total increased height due to the spacing and plates' thickness as:

$$h_\alpha = \cos(\alpha)\left(h + x\left(1 - \frac{1}{n}\right)\left(1 - \frac{1}{\cos(\alpha)}\right)\right). \tag{2}$$

For a certain maximal angle which depends on the plane plate's thickness h, inter-plate gap width x, and number of cones n, the adjusted wall's thickness $h_\alpha$ reduces to zero. This limitation defines the range of possible variations of the cone slope angle. It should be mentioned that the limit of $\alpha=0$ reproduces the base design of the stack of flat discs.

To retain the independence of the surface area on $\alpha$, the length of the cone should also be adjusted as $r(\alpha)=r(0)$ $\sqrt{1/\cos(\alpha)}$. Here r(0) is the outer radius of the cone (disc) when the cone angle $\alpha=0$. The results of the corresponding numerical experiments of calculating the reflection coefficient for the variable cone angle are given in FIG. 14.

Figure 14:
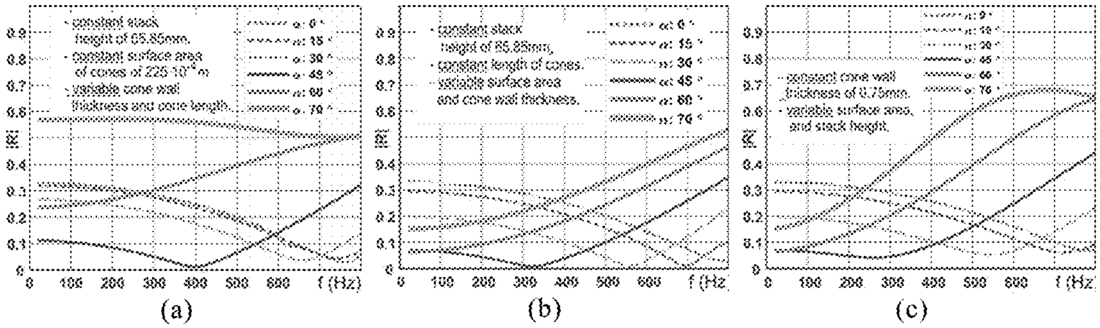

The result presented in FIG. 14(*a*) signifies that when keeping other essential parameters constant, the cone angle variation strongly affects the frequency dependence of the reflection coefficient. Looking on the lines which represent a large cone angle, one can see that the effect of the wave front expansion is large, non-monotonic, and varies depending on the frequency range. The general observation is that for a given set of other parameters there is an optimal cone angle which minimizes the reflection. When the cone angle is not very steep, less than ~45°, the differences between the lines in FIGS. 14(*a*) and (*b*) are moderate, which signifies a relatively small contribution from maintaining the same area.

Considering also practical applications for the low-reflecting termination, the design with cones can be advantageous because of the smaller transversal size. The data presented in FIG. 14(*c*) suggest that this is well feasible to get a low reflecting termination using the cones of fixed dimensions. An optimization within the parametric space of the inter-cones gap widths and the number of cones allows performance improvement.

Optimal Ratio of the Duct's Area and Area of the Stack's Inlet

Figure 15:
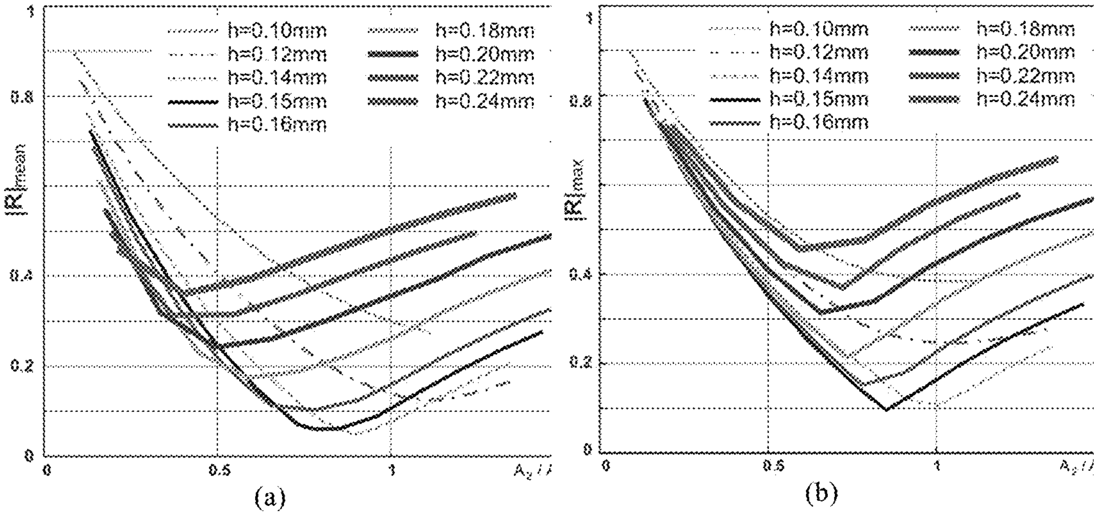

The variation of the inter-plates gap and the number of plates affect simultaneously several physical mechanisms which may govern the waves' propagation and reflection. In addition to the already discussed factors, the geometrical characteristics at the stack entrance interface are also changed. By entering the stack, acoustic waves traverse the area discontinuity from the section area of the duct to the total area of all inter-plate gaps. Presumably, the ratio of these areas may play a significant role in the minimization of the reflection coefficient. To check this hypothesis the following calculation sequence was conducted. First, the dependence of the reflection coefficient on the excitation frequency (from 20 to 800 Hz) was calculated for a large number of combinations of inter-plate gaps and number of plates taken in a wide range and with small steps of the parameter variations. Next, two indicative reflection coefficients were calculated for each of the runs: i) arithmetic mean value of the reflection coefficient's magnitude, $|R_{mean}|$; ii) maximal value along the line of the reflection coefficient vs frequency, $|R_{max}|$. Finally, these indicative reflection coefficients are plotted as the function of the corresponding ratio of the area $A_2$ of all slots at the stack entrance to the section area $A_1$ of the duct/impedance tube. The results are presented in FIG. 15(*a*) for $|R_{mean}|$ and FIG. 15(*b*) for $|R_{max}|$.

It is noticeable that the global minimum (lowest achievable reflection) corresponds to an area ratio close to 1.00, as can be expected if the connection of two simple ducts is considered. However, for each particular inter-plate gap width, the optimal number of plates and accordingly the optimal area's ratio depends on the gap width and varies between ~0.5 and ~1. This fact can be used as design guidance to tentatively select a range of parameters where the optimal combination may be expected and searched. Furthermore, FIG. 15 suggests that within the constraints of the fixed size of plates, there is a global optimal combination of the number of plates and inter-plates gap width. The model predicts that for the considered case, the optimal combination is 0.14 mm or 0.15 mm for the spacing, and 50 to 60 for the number of plates. At this set of design parameters, one may expect the reflection coefficient below ~0.1 in the complete frequency range of 20-800 Hz. However, the sensitivity of the reflection coefficient to the spacing width is high. Therefore, the experimentally measured value strongly depends on the accuracy of manufacturing.

Few Selected Subjects

Before ending the presentation of the obtained results with conclusions and outlook, it is worth to mention a few results which can be of general interest for the reader.

The first question of natural curiosity is: how performs the termination at frequencies above the studied range?

Figure 16:
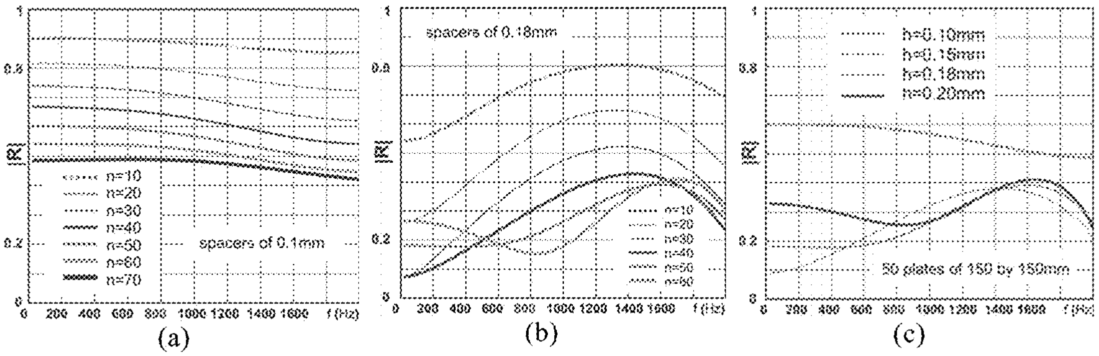

The used experimental setup does not allow this kind of measurement, but the model does. FIG. 16 shows the reflection coefficient for a few terminations modeled for frequencies up to 2 KHz.

One can see that for the small inter-plate gap, the lines are smoothly extended—see FIGS. 16(*a*) and (*c*). For the larger gap, like one in FIGS. 16(*b*) and (*c*), the reflection coefficient grows when measured at higher frequencies.

The acoustic wave may induce vibrations of the plates which in turn can affect back the wave propagation, attenuation, reflection. Can these effects be included in the model and what is the role of structural mechanics of the plates?

For the purpose to check the role of structural vibration the acoustic model can be coupled with the structural mechanics of plates. Two types of interfaces are available in the COMSOL 'Structural Mechanics Module': i) membrane; ii) shell. Without going to the details of this modeling, the general output can be formulated as the following: "the model with ideally stiff plates captures the main features of the physical processes in the termination and the structural-acoustics interaction effects are of secondary order of importance."

Is it possible to combine the stack of plates type of the termination with other known ideas of the anechoic termination?

From our experience, it is readily possible. For instance, the stack of cones construction can be supplemented by the fibrous material inside the stack. This combination profits from the synergy of low reflection at the low end of the frequency range provided by the stack and additional suppression of reflection provided by the porous material at higher frequencies.

Conclusions

The results of the performed experimental and numerical parametric study of the performance of the "stack of plates" termination together with the dedicated experiments aiming to elucidate the working principles of the termination lead to the following conclusions:

From an application point of view,

- The proposed construction of the termination allows achieving a low-reflecting duct termination in a wide range of frequencies including the very low end. The termination is compact, low-cost, and it can be made using standard production facilities. The typical value of |R|~0.05-0.1 in the frequency range 20-800 Hz was experimentally confirmed.
- For the fixed terminating duct diameter, the following constructive parameters of the stack of plates are important: 1) the external size of the plates; 2) inter-plates gap width; 3) the number of plates.
- For the particular example of fixed terminating duct diameter of 50 mm and fixed size of the plates (150 by 150 mm), the optimal air gap should be searched in the range of 0.1-0.2 mm. Also, the optimal number of plates is between 55 to 65 which can be evaluated from the ratio of the duct section area and the sum of areas between the plates at the inner edge. The ratio should be around 0.5-1 for the best performance. Regarding the working principle and physical phenomena governing the performance of the termination, the following can be deduced from the obtained results:

The processes governing the performance of the termination are i) acoustic attenuation due to the viscosity and heat conductivity in the narrow inter-plate region; ii) the wave front expansion in the radial direction; iii) the reflection at the area discontinuity at the inner interface of the stack.

There is no unique dominating effect. The proper matching of the combination of the above enumerated processes is crucial for the tuning of the entrance impedance and therefore the minimization of the reflection coefficient.

The plate's thickness and mechanical properties of the material are parameters of secondary importance.

The boundary conditions imposed on the exit plane of the stack are crucially important for the performance of the termination. The low-reflecting operation can be arranged, when an open-end condition is provided. The effect of wave radiation from the lateral surfaces of the stack to the free space has a weak effect on the total performance of the termination and can be neglected both in the numerical model and the analytical considerations.

The finite element numerical model realized within COMSOL Multiphysics software package and using the sub-module of the narrow region acoustics is capable to reproduce correctly the physical experiments. Therefore, the model can be used for the basic design of the termination performance, performance optimization, and research.

It is also possible to modify the invention according to the present application suitably. For instance, it is possible to consider a combination of several groups of plates with different inter-plate gap widths. The termination presented in FIG. 2 is an example when the 30 plates with a gap of 0.15 mm are combined with 30 plates with a gap of 0.18 mm.

As mentioned before, the invention according to the present disclosure can be used for any combustion appliances like domestic boilers, industrial boilers, jet engines, gas turbines, etc. as a method to handle problem of thermo-acoustic instability of combustion. Similarly, the problem of flow-born autonomous noise/instability in ducting systems can be approached using the invented device. Also, it can be applied in any acoustic, aeroacoustics and/or combustion laboratory for scientific purposes. Another category of the invention applications is it using in HVAC industry and air duct systems.

The invention claimed is:

1. An acoustic dampener for a duct carrying an acoustic signal, the acoustic dampener comprising:

a plurality of laminar surfaces stacked on top of one another and separated from one another, thereby creating a stack, the stack having a closed back end, wherein the plurality of laminar surfaces includes a front laminar surface and a back laminar surface, wherein a periphery side of the stack is exposed to an open atmosphere or to a closed box with particular sizes;

a hole arranged in each of the plurality of laminar surfaces, and in the front laminar surface wherein the hole has dimensions enabling a duct carrying an acoustic signal, to be connected to the acoustic dampener; and a clamp for clamping together the front laminar surface, the stack of plurality of laminar surfaces and the back laminar surface to create an acoustic dampener, wherein the plurality of laminar surfaces are separated from one another by air gaps of between 0.1 mm to 0.2 mm.

2. The acoustic dampener according to claim 1, wherein the plurality of laminar surfaces are separated from one another by a separator.

3. The acoustic dampener according to claim 2, wherein the separator are comprises spacers and/or protrusions on the plurality of laminar surfaces.

4. The acoustic dampener according to claim 1, wherein the plurality of laminar surfaces, the front laminar surface and the back laminar surfaces are all flat plates.

5. The acoustic dampener according to claim 4, wherein the front flat plate and the back flat plate are thicker than the plurality of flat plates.

6. The acoustic dampener according to claim 1, further comprising a rigid blind plate completing the stack of plurality of laminar surfaces to form the closed end.

7. The acoustic dampener according to claim 1, wherein the plurality of laminar surfaces comprises 10 to 65 laminar surfaces.

8. The acoustic dampener according to claim 1, wherein the plurality of laminar surfaces comprises groups of plates with different inter-plate gap widths.

9. A broadband low frequency acoustic dampener for a duct carrying an acoustic signal, the acoustic dampener comprising:

a plurality of laminar surfaces stacked on top of one another and separated from one another, thereby creating a stack, wherein the plurality of laminar surfaces includes a front laminar surface and a back laminar surface and wherein the plurality of laminar surfaces is separated from one another by gaps having a thickness smaller than a doubled Stokes boundary layer for acoustic signal frequencies below 800 Hz; and a hole arranged in each of the plurality of laminar surfaces, wherein the hole has dimensions enabling a duct carrying an acoustic signal, to be connected to the acoustic dampener, wherein a periphery side of the stack is exposed to an open atmosphere or to a closed box with particular sizes.

10. The broadband low frequency acoustic dampener according to claim 9, further comprising a clamp for clamping together the front laminar surface, the stack of plurality of laminar surfaces, and the back laminar surface to create an acoustic dampener.

11. The broadband low frequency acoustic dampener according to claim 9, wherein the plurality of laminar surfaces are separated from one another by gaps of 0.1 to 0.2 mm.

12. The broadband low frequency acoustic dampener according to claim 9, wherein the plurality of laminar surfaces is configured such that the stack has a reflection coefficient that is less than 0.1 in a frequency range 20 Hz to 800 Hz.

13. The broadband low frequency acoustic dampener according to claim 9, wherein the gaps separating the pluralities of laminar surfaces have a thickness of a Stokes boundary layer for acoustic signal frequencies below 800 Hz.

14. The broadband low frequency acoustic dampener according to claim 9, wherein the gaps separating the pluralities of laminar surfaces have a thickness smaller than a doubled Stokes boundary layer for acoustic signal frequencies below 100 Hz.

15. The broadband low frequency acoustic dampener according to claim 9, wherein the gaps separating the pluralities of laminar surfaces have a thickness of a Stokes boundary layer for acoustic signal frequencies below 100 Hz.

* * * * *